US010044702B2

(12) United States Patent
Lee

(10) Patent No.: US 10,044,702 B2
(45) **Date of Patent: *Aug. 7, 2018**

(54) CROSS INSTANCE USER AUTHENTICATION ARCHITECTURE

(71) Applicant: salesforce.com, inc., San Francisco, CA (US)

(72) Inventor: Jong Lee, Pleasanton, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,273

(22) Filed: Feb. 27, 2017

(65) Prior Publication Data

US 2017/0171190 A1 Jun. 15, 2017

Related U.S. Application Data

(63) Continuation of application No. 14/709,822, filed on May 12, 2015, now Pat. No. 9,584,505, which is a (Continued)

(51) Int. Cl.

*G06F 21/31* (2013.01)
*H04L 29/06* (2006.01)
*H04L 29/08* (2006.01)

(52) U.S. Cl.

CPC .......... *H04L 63/0815* (2013.01); *H04L 67/02* (2013.01); *H04L 67/10* (2013.01)

(58) Field of Classification Search

CPC ... H04L 63/083; H04L 63/0815; H04L 67/02; H04L 67/10

See application file for complete search history.

(56) References Cited

U.S. PATENT DOCUMENTS 6,826,692 B1 * 11/2004 White ................. H04L 63/0815 709/208
7,174,018 B1 * 2/2007 Patil .................... H04L 63/0442 380/258

(Continued)

*Primary Examiner* — Noura Zoubair
(74) *Attorney, Agent, or Firm* — Elliot, Ostrander & Preston, P.C.

(57) ABSTRACT

In accordance with disclosed embodiments, there are provided methods, systems, and apparatuses for implementing a cross instance user authentication architecture in an on-demand service environment including, for example, means for receiving a login request at a global Virtual Internet Protocol (VIP) address for the host organization from a client device; forwarding the login request received at the global VIP address to one of a plurality of datacenters within the host organization; determining the selected datacenter is a non-home-geo datacenter for a user associated with the login request received from the client device; establishing a back-end link from the non-home-geo datacenter to a home-geo datacenter for the user; forwarding the login request from the non-home-geo datacenter to the home-geo datacenter via the back-end link for authentication of the client device at the home-geo datacenter responsive to the login request received from the computing device; and returning a response to the client device from the non-home-geo datacenter upon successful authentication of the login request at the home-geo datacenter, wherein the response specifies a re-direct to the home-geo datacenter for the user. Other related embodiments are disclosed.

20 Claims, 9 Drawing Sheets

Related U.S. Application Data continuation of application No. 13/864,549, filed on Apr. 17, 2013, now Pat. No. 9,032,488.

(60) Provisional application No. 61/625,194, filed on Apr. 17, 2012.

(56) References Cited

U.S. PATENT DOCUMENTS

2010/0332664 A1* 12/2010 Yevmenkin ....... H04L 29/12405 709/227
2011/0078437 A1* 3/2011 Reddy ................. H04L 63/0815 713/155
2012/0151568 A1* 6/2012 Pieczul ............... H04L 63/0815 726/8

* cited by examiner

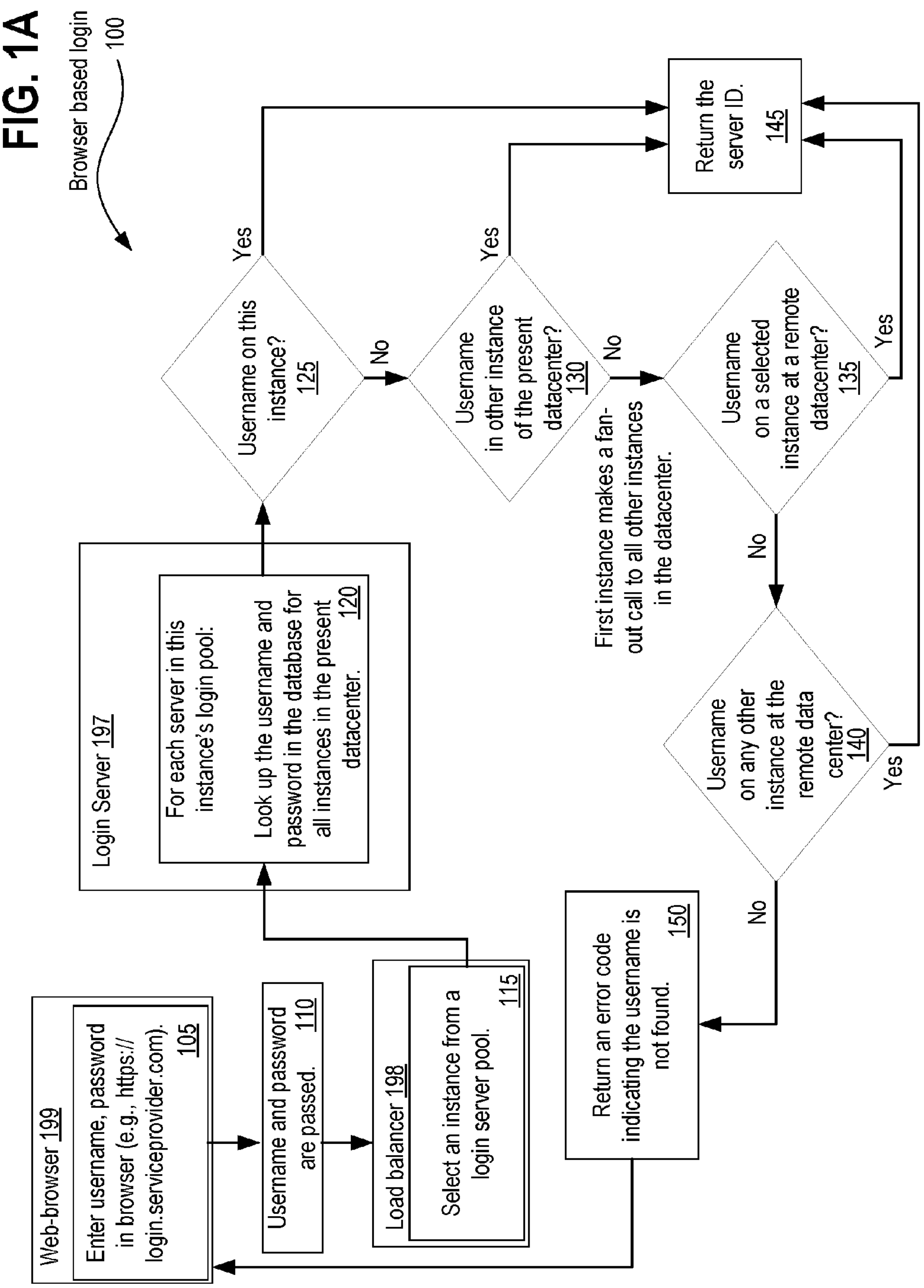
FIG. 1A
Browser based login
100
Web-browser 199
Enter username, password in browser (e.g., https://login.serviceprovider.com).
105
Username and password are passed. 110
Load balancer 198
Select an instance from a login server pool.
115
Login Server 197
For each server in this instance's login pool:
Look up the username and password in the database for all instances in the present datacenter.
120
Username on this instance?
125
Yes
No
Username in other instance of the present datacenter?
130
Yes
No
First instance makes a fan-out call to all other instances in the datacenter.
Username on a selected instance at a remote datacenter?
135
Yes
No
Username on any other instance at the remote data center?
140
Yes
No
Return the server ID.
145
Return an error code indicating the username is not found.
150

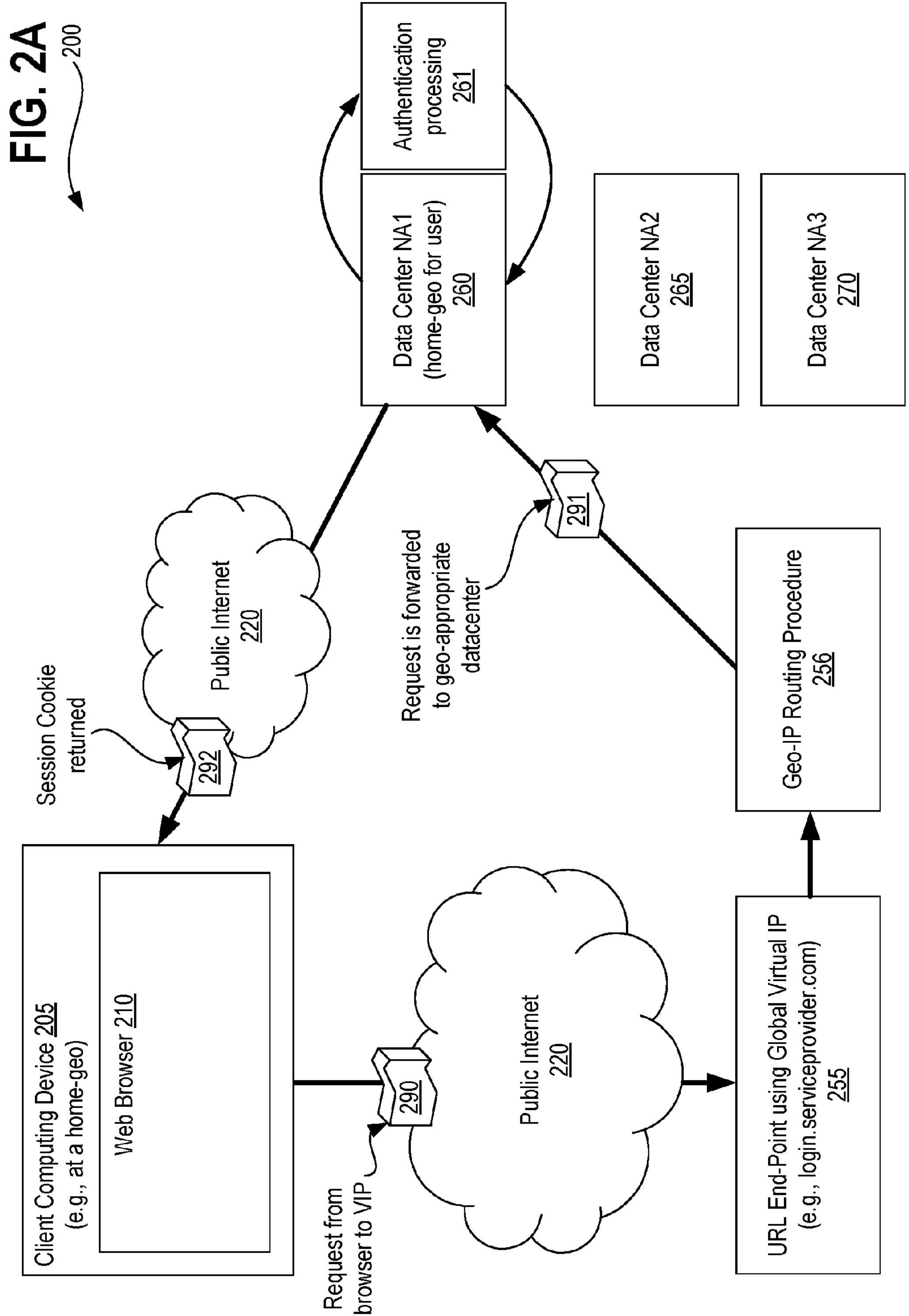
FIG. 2A
200
Authentication processing 261
Data Center NA1 (home-geo for user) 260
Data Center NA2 265
Data Center NA3 270
Public Internet 220
Session Cookie returned
292
Request is forwarded to geo-appropriate datacenter
291
Geo-IP Routing Procedure 256
Client Computing Device 205 (e.g., at a home-geo)
Web Browser 210
290
Request from browser to VIP
Public Internet 220
URL End-Point using Global Virtual IP (e.g., login.serviceprovider.com) 255

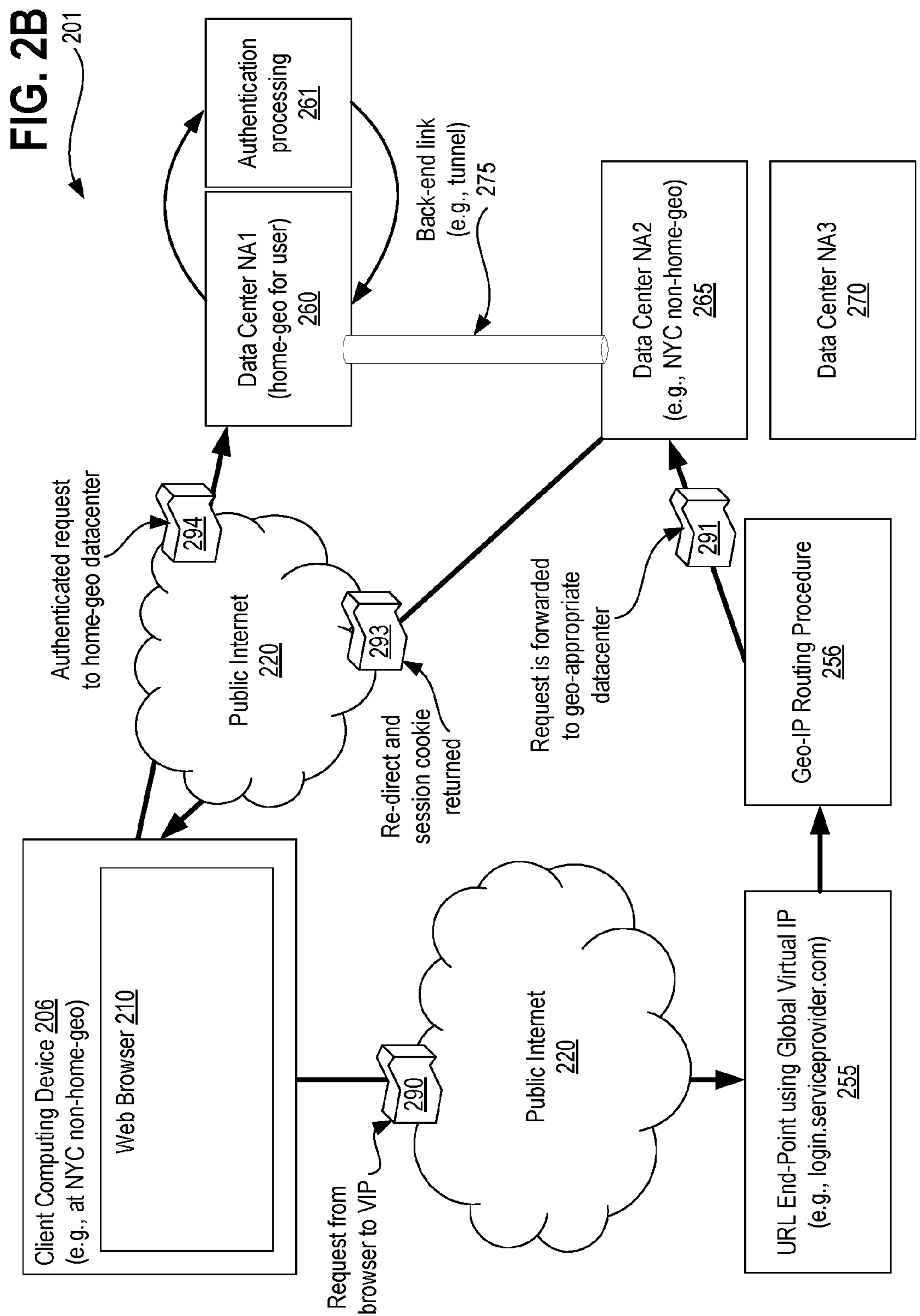
FIG. 2B
201
Authentication processing 261
Data Center NA1 (home-geo for user) 260
Back-end link (e.g., tunnel) 275
Data Center NA2 (e.g., NYC non-home-geo) 265
Data Center NA3 270
Authenticated request to home-geo datacenter
294
Public Internet 220
293
Re-direct and session cookie returned
Request is forwarded to geo-appropriate datacenter
291
Geo-IP Routing Procedure 256
Client Computing Device 206 (e.g., at NYC non-home-geo)
Web Browser 210
290
Public Internet 220
Request from browser to VIP
URL End-Point using Global Virtual IP (e.g., login.serviceprovider.com) 255

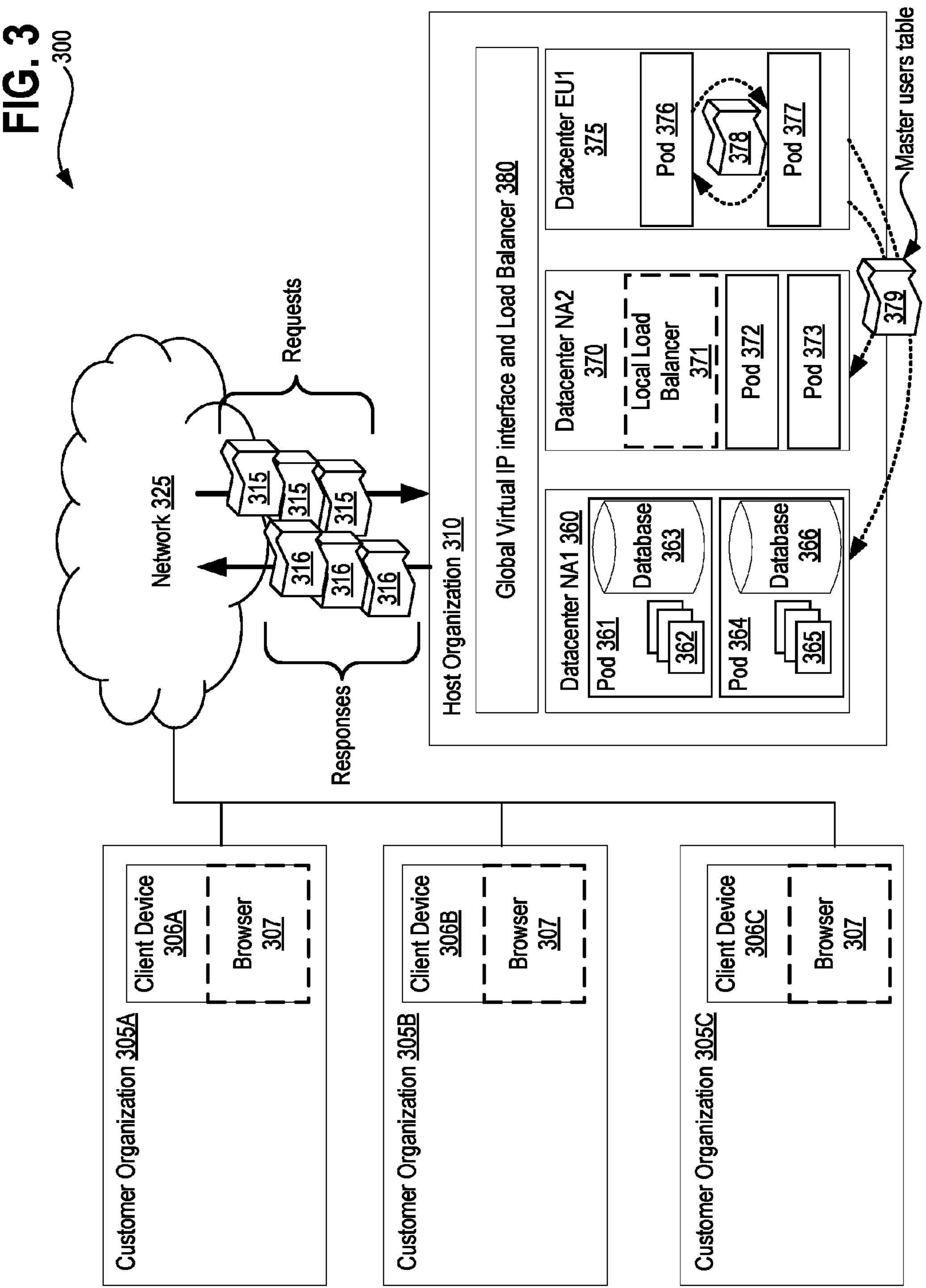
FIG. 3
300
Network 325
Requests
Responses
315
316
Host Organization 310
Global Virtual IP interface and Load Balancer 380
Datacenter NA1 360
Pod 361
362
Database 363
Pod 364
365
Database 366
Datacenter NA2 370
Local Load Balancer 371
Pod 372
Pod 373
Datacenter EU1 375
Pod 376
378
Pod 377
379
Master users table
Customer Organization 305A
Client Device 306A
Browser 307
Customer Organization 305B
Client Device 306B
Browser 307
Customer Organization 305C
Client Device 306C
Browser 307

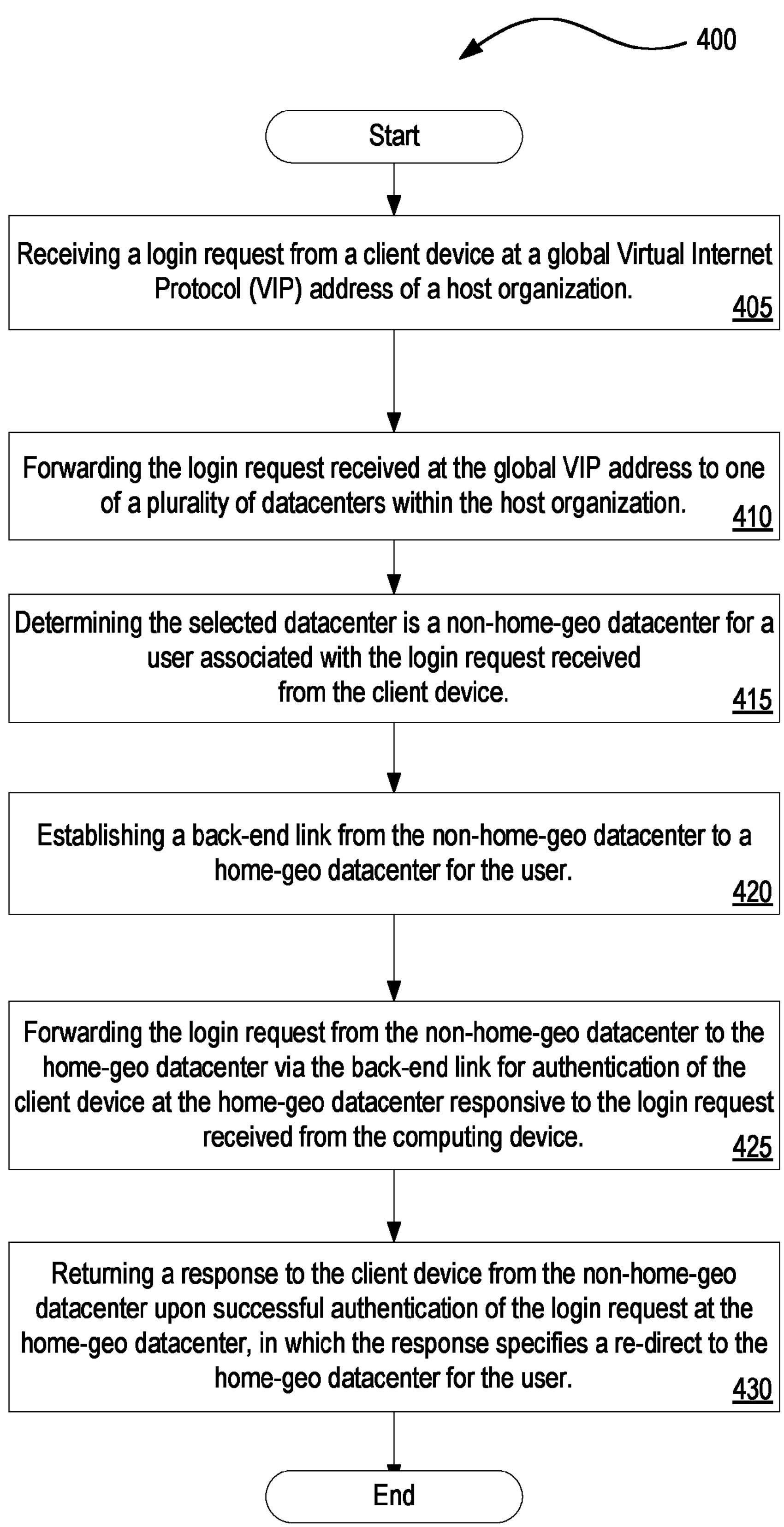
400
FIG. 4
Start
Receiving a login request from a client device at a global Virtual Internet Protocol (VIP) address of a host organization.
405
Forwarding the login request received at the global VIP address to one of a plurality of datacenters within the host organization.
410
Determining the selected datacenter is a non-home-geo datacenter for a user associated with the login request received from the client device.
415
Establishing a back-end link from the non-home-geo datacenter to a home-geo datacenter for the user.
420
Forwarding the login request from the non-home-geo datacenter to the home-geo datacenter via the back-end link for authentication of the client device at the home-geo datacenter responsive to the login request received from the computing device.
425
Returning a response to the client device from the non-home-geo datacenter upon successful authentication of the login request at the home-geo datacenter, in which the response specifies a re-direct to the home-geo datacenter for the user.
430
End 500
502
PROCESSOR
PROCESSING LOGIC
526
504
MAIN MEMORY
Global Virtual IP interface
524
Global Load Balancer
523
Local Load Balancer(s)
525
508
NETWORK INTERFACE CARD (NIC)
520
Network
BUS
530
536
PERIPHERAL DEVICE
512
ALPHANUMERIC INPUT DEVICE
CURSOR CONTROL DEVICE
514
510
USER INTERFACE
516
INTEGRATED SPEAKER
518
SECONDARY MEMORY
MACHINE-ACCESSIBLE STORAGE MEDIUM
531
SOFTWARE
522

CROSS INSTANCE USER AUTHENTICATION ARCHITECTURE

CLAIM OF PRIORITY

This continuation application is related to, and claims priority to, the utility application entitled "CROSS INSTANCE USER AUTHENTICATION ARCHITECTURE," filed May 12, 2015, having an application Ser. No. 14/709,822, which is a continuation application related to, and claims priority to, the utility application entitled "CROSS INSTANCE USER AUTHENTICATION ARCHITECTURE," filed Apr. 17, 2013, having an application Ser. No. 13/864,549; and is further related to and claims priority to the provisional utility application entitled "CROSS INSTANCE USER AUTHENTICATION ARCHITECTURE," filed on Apr. 17, 2012, having an application No. 61/625,194, the entire contents of each being incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to systems, methods, and apparatuses for implementing a cross instance user authentication architecture in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

Within an on-demand service environment it is necessary to authenticate users before allowing them to access any particular data repository so as to ensure the user possesses the appropriate credentials. This is generally referred to as the user log in process.

From an infrastructure point of view the user log in process may be handled via centralized log in servers which are dedicated to handling the authentication process. Such a model is less complex but also provides for a single point of failure which may be catastrophic to a services provider.

Alternatively, a distributed model may be utilized such that computing resources throughout the service provider's infrastructure perform user authentication for the user log in process, but the distributed approach has conventionally required replication of users so as to enable the disparate non-centralized servers to handle such requests without having to reference or communicate with a single centralized repository as part of the user log in process.

Unfortunately, replicating users is problematic because users are globally unique, and thus, replication of users for the sake of a distributed authentication model violates the requirement that any given user be globally unique within such a system.

The present state of the art may therefore benefit from methods, systems, and apparatuses for implementing a cross instance user authentication architecture as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A depicts an exemplary process flow in accordance with described embodiments;

FIG. 2A depicts an exemplary architecture in accordance with described embodiments;

FIG. 2B depicts an alternative exemplary architecture in accordance with described embodiments;

FIG. 3 depicts an alternative exemplary architectural overview of the environment in which embodiments may operate;

FIG. 4 is a flow diagram illustrating a method in accordance with disclosed embodiments;

DETAILED DESCRIPTION

Figure 1B:
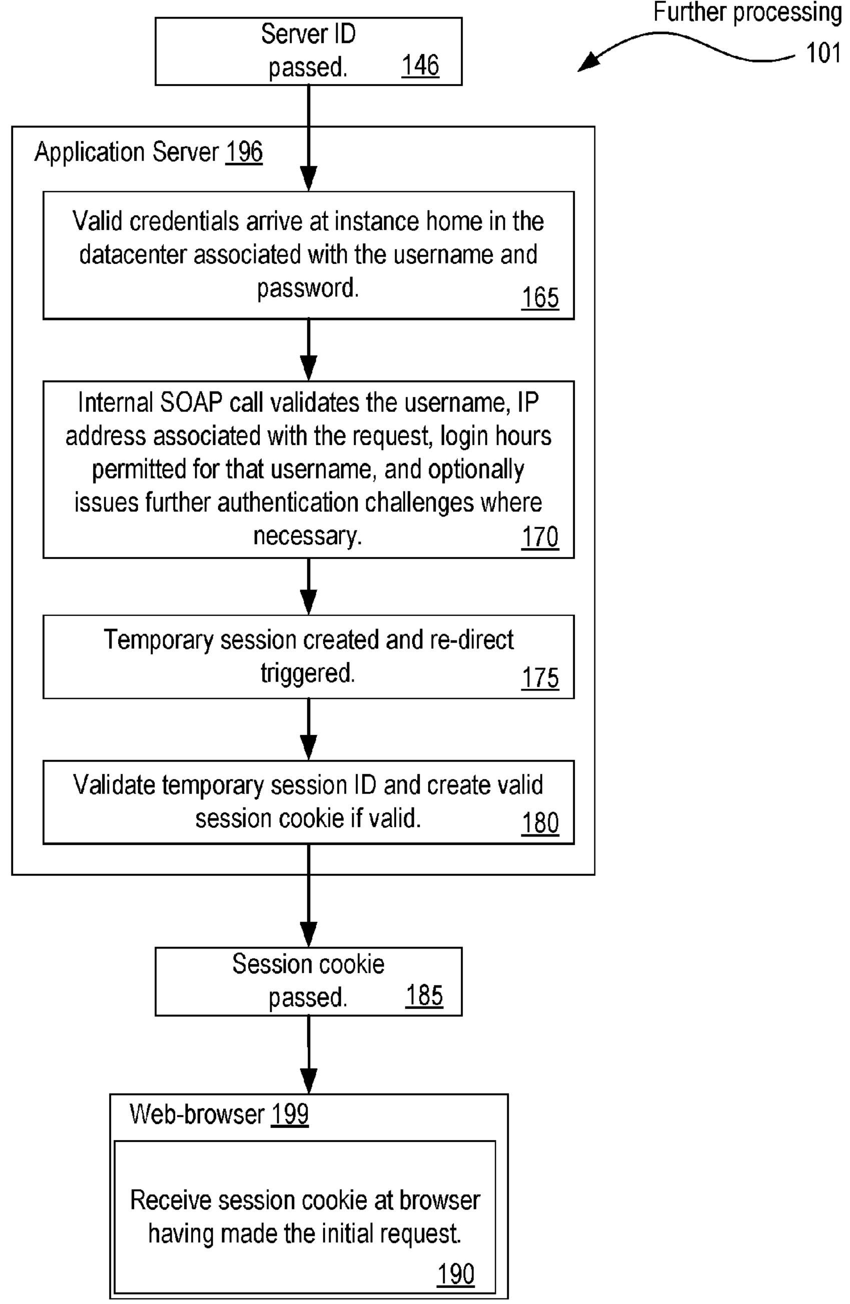
FIG. 1B depicts further processing in accordance with described embodiments.

Described herein are systems, devices, and methods for implementing a cross instance user authentication architecture in an on-demand service environment.

In one embodiment, such means include: receiving a login request at a global Virtual Internet Protocol (VIP) address for the host organization from a client device; forwarding the login request received at the global VIP address to one of a plurality of datacenters within the host organization; determining the selected datacenter is a non-home-geo datacenter for a user associated with the login request received from the client device; establishing a back-end link from the non-home-geo datacenter to a home-geo datacenter for the user; forwarding the login request from the non-home-geo datacenter to the home-geo datacenter via the back-end link for authentication of the client device at the home-geo datacenter responsive to the login request received from the computing device; and returning a response to the client device from the non-home-geo datacenter upon successful authentication of the login request at the home-geo datacenter, in which the response specifies a re-direct to the home-geo datacenter for the user.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1A depicts an exemplary process flow 100 in accordance with described embodiments. In particular, process flow 100 depicts processing that may occur when a user attempts a login from a web-browser. Other login requests may also be handled by such a flow, including performing authentication for SAML (Security Assertion Markup Language) type logins, OATH (initiative for Open AuTHentication) type logins, customer portal type logins, API (Application Programming Interface) based logins, as well as others.

In an on-demand service environment, implementation of a distributed authentication model overcomes certain problems associated with a centralized authentication utilized by some service providers. For instance, though a centralized authentication model is less technically complex, it is vulnerable to catastrophic failure for the service provider because it provides a single point of failure. For instance, whether due to a malicious attack such as a DDOS (Distributed Denial Of Service) attack against the authentication means for the service provider, service outages owing to system hardware failures, infrastructure damage incurred as the result of a natural disaster at the geographic location of the datacenter, or even software and maintenance problems with the authentication means, any problem which makes the centralized authentication unavailable to users renders the entire suite of services provided by the service provider inaccessible and thus useless. Such an outage may even result from ordinary usage in which an unexpected peak demand occurs resulting in slowed or failed authentications as contention and re-try attempts cause system thrashing and further exacerbate the problem.

A distributed authentication model on the other hand permits the system to overcome these issues by, for example, servicing authentication requests at an alternative location when an initial location suffers any of the above mentioned anomalies. Additionally, such a distributed authentication model permits further computing resources to be dynamically applied on an as-needed basis by allocating additional resources to authentication requests during peak periods and then de-allocating such resources from performing authentication services when they are no longer required.

At FIG. 1A, there is depicted a web-browser 199 which may operate at a client device and there are further depicted a load balancer 198 and a login server 197, each of which may operate within a host organization, such as at a datacenter having computational resources therein for performing various operations including supporting authentication and login processes.

In this example, processing begins with block 105 in which a user enters a username and password into a web-browser 199, for instance, by navigating to a login landing page for a given service provider, such as the fictitious but exemplary https://login.serviceprovider.com. The username and password are then passed as depicted at block 110. For instance, the username and password may be passed via the public Internet to a host organization operating as the service provider, and more specifically, passed to a load balancer 198 which then selects an instance from a login server pool as is indicated block 115.

Processing then advances to the login server 197 in which, for each server in that instance's login pool, processing looks up the username and password in the database for all instances in the present datacenter as indicated at block 120. For instance, a host organization may have multiple datacenters distributed geographically, and processing looks up all instances in the particular datacenter at which processing is being handled.

At decision point 125 it is determined whether the username is on the particular instance selected. If yes, then processing advances to block 145 where the server ID for the instance having the username is returned. If no, the username is not on that instance, then processing advances to decision point 130.

At decision point 130 it is determined whether the username is in another instance of the present datacenter. Such a determination is made by the first instance performing a fan-out call to all other instances within the present datacenter. If yes, the username is in another instance of the present datacenter, then processing advances to block 145 where the server ID for the instance having the username is returned. If no, the username is not in another instance of the present datacenter, then processing advances to decision point 135.

At decision point 135 it is determined whether the username is on a selected instance at a remote datacenter. For instance, the host organization having multiple datacenters distributed geographically may thus cause the instance in first datacenter handling the present processing to select an instance at a remote datacenter, so as to query whether the username exists at that remote datacenter's instance. If yes, the username is on the selected instance at the remote datacenter, then processing advances to block 145 where the server ID for the instance at the remote datacenter having the username is returned. If no, the username is not on the selected instance at the remote datacenter, then processing advances to decision point 140.

At decision point 140 it is determined whether the username is on any other instance of the remote datacenter. For example, just as with the first datacenter handling the processing for the initially received username and password, an instance at the remote datacenter may be selected when necessary and then that selected instance at the remote datacenter will perform a fan-out call to all the other instances within the remote datacenter to determine if any other instance at the remote datacenter possesses the username specified. Moreover, this process may be triggered at each of multiple remote datacenters for the host organization where more than two datacenters exist. If yes, the username is in another instance of the remote datacenter, then processing advances to block 145 where the server ID for the instance having the username is returned. If no, the username is not found at any other instance of the remote datacenter, then processing advances to block 150 where an error code is generated indicating the username is not found and the error code is then returned back to the web-browser 199 having initiated the login processing. The described instances may correspond to computing pods of the respective datacenters, in which each computing pod includes a local database instance and a pool of application servers by which workload on behalf of the host organization may be performed. Each datacenter may include a plurality of such instances or computing pods, each of which may need to be checked to determine if the specified username is presently known to the host organization.

FIG. 1B depicts further processing 101 in accordance with described embodiments. In particular, the further processing 101 is performed based on the returned server ID from block 145 of FIG. 1A when the username is found.

Processing begins with the server ID being passed to the application server 196 as is indicated by block 146. The server ID corresponding to the one returned via processing at block 145 of FIG. 1A. The server ID may represent a particular computing pod within a datacenter, an application server pool within a datacenter, or a specific computing device within such an application server pool of a datacenter.

Within the application server 196, valid credentials arrive at the instance home in the datacenter which is associated with the username and password, as indicated by block 165. For example, a user may be associated with a datacenter organization having a geographic physicality in San Francisco, near the user who resides in or around the San Francisco area. If the same user visits New York City on the east coast, then such a user's request may initially be routed to a datacenter nearer to New York City than the one in San Francisco. Once the user's username is identified by a particular instance, the user's credentials will be sent to the instance home at the San Francisco datacenter which is associated with the user account residing within that instance. In such a way, it is not necessary to replicate the user to the datacenter near New York City because authentication processing may take place at the home instance in the San Francisco datacenter once the login request is routed appropriately.

Processing continues at block 170 in which the application server 196 performs an internal SOAP (Simple Object Access Protocol) call, or other satisfactory call, to validate the username passed, validate an Internet Protocol (IP) address associated with the user's request, validate permissions for the user against login hours permitted for the username specified, and optionally issue further authentication challenges where necessary.

At block 175, a temporary session is created and a re-direct is triggered to the correct home instance for the username specified as described above, for instance, by triggering a re-direct from the datacenter near New York City back to the user's home instance in the datacenter located in San Francisco.

Consider for example, a user opening a web-browser 199 and navigating to login.serviceprovider.com. A load balancer 198 responsible for handling such requests may select datacenter NA1 (North America #1) for handling the request based on geographic proximity to the user making the request or based on resource availability, or based on server load. Regardless of how NA1 is selected, an application server 196 at the NA1 datacenter looks up the username specified as described previously and determines that username is not at NA1 but rather, is at NA6 (e.g., North America #6). The application server 196 at the NA1 datacenter thus makes a cross-instance call to the NA6 datacenter to perform authentication for the user making the request based on the specified username being associated with the NA6 datacenter. Subsequent to successful authentication of the login request by the NA6 datacenter the application server at the NA1 datacenter returns a redirect URL (e.g., specifying https://na6.serviceprovider.com/redirect?sid=encoded_value) to the user requesting the login instructing the user's web-browser 199 to utilize the specified URL to communicate further with the host organization via an authenticated session between the user's web-browser and the specified NA6 datacenter (e.g., the NA1 datacenter responds to the user's web-browser 199 with a redirect specifying the NA6 datacenter via the re-direct URL).

At block 180, the temporary session ID is validated and a valid session cookie is created when the temporary session ID is determined valid resulting in the authenticated session to be used for further communications between the user's web-browser and the host organization. The application server 196 creates the session cookie and sends it to the user's web-browser 199 as part of the login response. According to one embodiment, the session cookie is instance specific and contains the following: (a) A routing hint which is then used by the load balancer 198 to aid in determining to which application server instance the request should be routed. Such information may be stored within a session ID as follows: SessionKey.prependUnencodedLoadBalancerHint ( ). The session cookie may further include (b) a session ID which is composed of a base64-encoded random key with checksum in which the random key is a unique key to the session database table.

Processing then causes the session cookie to be passed at block 185 and the user's web-browser 199 receives the session cookie at the browser having made the initial request as is indicated by block 190.

The user's web-browser 199 receives the session cookie and stores it in browser memory for the duration of the browser session or until the session times out. A session ID within the session cookie is sent with each request after a successful login. The browser uses the domain value of the session cookie to determine whether to send the cookie or not. For example, if the session domain is set to na6.serviceprovider.com responsive to a re-direct or otherwise, then the session ID will be sent when the current request is https://na1.serviceprovider.com. Conversely, the user's web-browser 199 won't send the session ID for any other domain.

If the session ID is not sent with the request then it is treated as an unauthenticated request. When an application server receives a session cookie with a request, it ignores the routing hint and it decodes the session ID from base64 to text; validates the checksum; evaluates the random key portion of the session ID, which is the primary key to the session table on the database; and compares the session ID to the value stored in the session table to validate it. These values may also be cached so that a database query is not needed. Once the session ID is validated, additional validation is performed, such as making sure the current IP address matches the one used to create the session and verifying that the session hasn't expired yet, and so forth.

By looking up the username in a selected instance, any login server is able to determine the actual user's instance and corresponding home-geo datacenter, regardless of whether such an instance is within the present datacenter processing the login request or at a remote datacenter. If the user's instance is different than the one handling the original login request then a separate cross-instance login call may be initiated to the correct instance based on a server ID returned via the processing described earlier at FIG. 1A, regardless of whether the correct instance is another computing pod within the same datacenter or at a remote datacenter. For an unknown username, additional username discovery may be initiated by making fan out calls first to the other instances within the same datacenter first and then to one or remote datacenters. If still no username is found, then an error code is triggered and a counter is maintained for that requestor's IP as a means to protect against DOS or brute force attacks. For instance, if the bad username attempts exceed a threshold limit, then all subsequent user login attempts from the same IP are rejected without any attempted authentication for at least a period of time. For example, the counter may be reduced gradually or reset after a time period of inactivity. In an optional embodiment, a check is conducted to determine if replication of a users table is behind, delayed, or out of synch, and if so, then the fan-out operations described are permitted, but if all such users tables are fully synchronized then it is not necessary to check other local instances replicated throughout a datacenter because a local username query miss will equate to a miss for the entire datacenter. Similarly, where a master users table is replicated globally across all datacenters then local miss will equate to a global miss on a username when replication is up to date, thus negating the need to conduct remote fan-out operations to the geographically dispersed datacenters of the host organization.

When a user is identified as valid but being processed at the wrong instance (e.g., not at the user's home-geo datacenter) then an internal cross-instance login call is triggered. For instance, a separate cross instance login request is initiated to the correct user instance at the user's home-geo datacenter. If the user instance is inside the same datacenter as the original login request but at a different computing pod than the one performing the initial processing, then traffic may stay internal to a single datacenter without going outside the datacenter's firewall. Conversely, if the user instance is on a remote datacenter from the one initially executing the authentication scheme, then the cross instance communication may occur within a secure direct connection implemented as a back-end link between datacenters, for instance, using secure HTTP tunneling, etc. A back-end link on the private network between datacenters of the host organization is fast and secure and will thus reduce latency experienced by the user in processing the authentication request, regardless of which datacenter receives the user's initial request.

FIG. 2A depicts an exemplary architecture 200 in accordance with described embodiments. In particular, a client computing device 205 having a web browser 210 is depicted at a home geographic location. For instance, a user who resides in San Jose, Calif. may have their data stored at a datacenter NA1 260 in nearby San Francisco, and thus, be associated with or affiliated with datacenter NA1 given the proximity to the users' home geographic location. Datacenter NA2 265 and datacenter NA3 270 are additionally depicted, but only datacenter NA1 is the home geographic location for the exemplary user in this example.

A host organization may have multiple such datacenters (e.g., 260, 265, and 270) and for any given user, their user data will be stored within one of the datacenters but not all. It may prove cost prohibitive to replicate a user's data across all datacenters and it may additionally be wasteful to do so because user's may rarely or never attempt to access their user data from most of the alternative datacenter locations for the host organization. Accordingly, a user's data is stored at a home geographic location which is generally in close geographic proximity to where a user spends most of their time. This home-geo datacenter is also where each respective users' credentials are stored and thus where authentication processing responsive to a login request will take place. Notably, a users table which specifies all valid users for a given datacenter may be replicated throughout such a datacenter or a master users table specifying all users known to the host organization and the corresponding home-geo datacenter for each user may be replicated across all datacenters so as to aid in routing a user's request to the correct datacenter associated with the user's home geography when a login request is received at a non-home geography datacenter.

Further depicted at FIG. 2A is a request from the browser being sent to a Virtual Internet Protocol (VIP) address as indicated at element 290. Such a request may be communicated through the public Internet 220 to a URL end-point using a global virtual IP 255 (e.g., such as login.serviceprovider.com) which thus enables a user anywhere in the world to access a single login page, regardless of their present location or their home location.

A virtual IP address is an IP address assigned to multiple applications residing on a single server, multiple domain names, or multiple servers, rather than being assigned to a specific single server or network interface card (NIC).

Incoming data packets are sent to the VIP address which are routed to actual network interfaces. A server IP address depends on the MAC address of the attached NIC, and only one logical IP address may be assigned per card. However, VIP addressing enables hosting for several different applications and virtual appliances on a server with only one logical IP address. VIPs have several variations and implementation scenarios, including Common Address Redundancy Protocol (CARP) and Proxy Address Resolution Protocol (Proxy ARP). virtual IP addresses are commonly used for connection redundancy by providing alternative fail-over options in which a virtual IP address remains available even when a computer or NIC fails, because an alternative computer or NIC replies to incoming connection requests. Here, the virtual IP address further negates the need to specify a particular datacenter among a plurality of available datacenters of the host organization, thus allowing users to specify a single URL end-point such as login.serviceprovider.com rather than having to specify, for example, na1.login.serviceprovider.com to access the login interface at a first datacenter or na2.login.serviceprovider.com to access the login interface at a different datacenter.

A geo-IP routing procedure 256 is next executed which identifies the most appropriate datacenter to service the request from the browser 290 based on the present geographic location of the client computing device 205. For instance, if the client computing device 205 is presently using an IP address in the San Jose Calif. area then a datacenter near the San Jose Calif. area will be selected. Conversely, if the client computing device 205 is presently using an IP address in the New York City area then a datacenter nearer to New York City will be selected to handle the request 290 from the browser, regardless to the user's home geography.

In this particular example, the client computing device is indicated as operating at its home geography, and as such, the geo-IP routing procedure 256 selects datacenter NA1 260 to handle the request 290, which is also the datacenter at the home-geo for the user. The geo-IP routing procedure 256 then forwards the request to the geo-appropriate datacenter selected as indicated by element 291.

Because the request is forwarded to the home-geo for the user at datacenter 260, the username is recognized as belonging to the datacenter NA1 260 and authentication processing 261 commences at datacenter NA1 260. Upon successful authentication of the user based on, for example, a passed username, password, as well as other conditions such as time of use, IP verification, further authentication challenges, and so forth, a valid session cookie 292 will be returned to the client computing device 205. The valid session cookie 292 may then be utilized by the client computing device 205 to make further requests for services, resources, access stored data, and so forth.

Because the user's client computing device 205 is located in the home-geo and authentication processing occurred at the datacenter NA1 260 associated with the user's home-geo it is not necessary to send a re-direct to the web-browser.

The exemplary single login endpoint at login.serviceprovider.com provides a login authentication service which is accessible via the single URL without being tied to the actual instance where any particular user's home-geo datacenter is located. A user may therefore login to the service from outside of a home-geo and yet still utilize the single login endpoint. The Geo-IP routing procedure 256 running at a global load balancer will analyze the incoming request and then selectively route the request to the dater center and login server pools geographically near the user for quick access and improved performance, regardless of how far the user travels from the home geography associated with the particular user.

FIG. 2B depicts an alternative exemplary architecture 201 in accordance with described embodiments. In particular, a client computing device 206 having a web browser 210 is depicted at a non-home geographic location. For instance, a user who resides in San Jose, Calif. may have traveled to New York City, and thus, the client computing device 206 will be utilizing an IP address from the New York City area rather than the San Jose, Calif. area.

In such an example, the user's client computing device 206 nevertheless utilizes the same URL end-point which is using the global virtual IP 255, for instance, by navigating the web browser 210 to the exemplary login.serviceprovider.com, just as with the previous example. However, the geo-IP routing procedure at 256 will forward the request to a geo-appropriate datacenter as indicated by element 291 and thus forward the request to the datacenter NA2 265 which, in this example, is in the NYC non-home-geo area for this particular user. The request is forwarded to the NYC area datacenter because it is assessed as being the most appropriate to service the user's request 290, regardless of where the user's home location may be.

Processing at the selected datacenter NA2 265 will identify datacenter NA1 260 as the home-geo for the specified user using the processing described at FIG. 1A. Rather than reject the user, processing at the datacenter NA2 265 opens a back-end link 275 between the datacenter NA1 260 which is the home-geo for the user and the datacenter NA2 265 which received the request due to its closer geographic proximity with the user's client computing device 206.

The back-end link 275 is created using a compatible tunneling protocol and operates much faster between the two datacenters 260 and 265 than what the client computing device 206 may attain by communicating with the now geographically distant datacenter 260 through the public Internet 220. The back-end link of the host organization between its own datacenters is of a greater quality and speed than what is generally available to the client computing device 206 in a geographically distant location from the home-geo datacenter 260.

A temporary session is requested via the back-end link 275 through which the username and password are then passed to the home-geo datacenter NA1 260 associated with the user and then authentication processing 261 occurs at the user's home-geo datacenter NA1 260. In one embodiment, the back-end link 275 is created using a secure HTTP tunneling protocol. In another embodiment, calls through the back-end link 275 are wrapped in a new secure request with a MAC in the header to protect against modification en-route through the back-end link 275. For instance, the MAC may operate as a hash on the input. In yet another embodiment, IP restriction is applied to prevent external parties from accessing or modifying calls being communicated through the back-end link 275 between datacenters 260 and 265.

Upon successful authentication using the temporary session and calls between the datacenters via the back-end link 275, a re-direct and session cookie is returned to the client computing device 206 as indicated by element 293. Once the client computing device 206 receives the session cookie and is re-directed to communicate through the public Internet 220 with its home-geo datacenter (e.g., datacenter NA1 260 in this example), the client computing device 206 will then direct its further communications to the home-geo datacenter 260 via an authentication session using the session cookie returned 293. For instance, the client computing device, subsequent to successful authentication and receipt of the returned session cookie 293, initiate authenticated requests to its home-geo datacenter as depicted by element 294.

Using such a technique, even where a user specifies a login interface at a particular datacenter, such as na1.login.serviceprovider.com, a user will still end up being re-directed to their home-geo datacenter for an authenticated session using the session cookie returned, assuming the datacenter NA1 260 specified by the URL is not the home-geo for the user. This may occur, for example, where a user's data has been migrated to a different datacenter and is thus affiliated with a new home-geography datacenter than the one specified by the user and perhaps different from the datacenter familiar to the user having specified the non-geo datacenter via the datacenter specific URL.

When an API client sends a login( ) request, the client device sends the username and password to the global Virtual IP Interface, for instance, by sending the request to a URL located at http://login.serviceprovider.com, which may be identical to the interface utilized by the browser interface described previously.

Unlike browser based requests, the API requests are given a permanent session ID and as such, operations related to temporary session IDs are omitted. Such an authentication mechanism may be applied to any infrastructure having multiple servers inside a single datacenter or multiple servers provisioned across multiple datacenters.

In certain embodiments, properties of original request are maintained, such as the IP address for the requesting client device. Where cross-instance calls are initiated on behalf of a client being processed at a non-home-geo location, the receiving application server may view the cross-instance call as a request from another internal server, but the request is actually being made on behalf of the original requesting client device. Accordingly, an HTTP header may be added to such cross-instance calls specifying the original client IP such that another server receiving a cross-instance call may read out the header to determine the originating client's IP address, rather than the IP address of the application server initiating the cross-instance call.

FIG. 3 depicts an alternative exemplary architectural overview 300 of the environment in which embodiments may operate. In particular, there are depicted multiple customer organizations 305A, 305B, and 305C. Obviously, there may be many more customer organizations than those depicted. In the depicted embodiment, each of the customer organizations 305A-C includes at least one client device 306A, 306B, and 306C. A user may be associated with such a client device, and may further initiate requests 315 to the host organization 310 which is connected with the various customer organizations 305A-C and client devices 306A-C via network 325 (e.g., such as via the public Internet).

According to one embodiment, the client devices 306A-C each include a web-browser 307 in support of the various methodologies described herein. The client devices 306A-C each individually transmit requests 315 to the remote host organization 310 via the network 325. The host organization 310 may responsively send responses 316 to the originating customer organization to be received via the respective client devices 306A-C and their supporting web-browsers 307.

Within host organization 310 is a global Virtual IP (VIP) interface and load balancer 380 which provides a single login point regardless of where a user's client device 306A-C is operating geographically. The global Virtual IP (VIP) interface and load balancer 380 facilitates receipt of initial authentication requests and selection of an application server instance to begin processing of the authentication requests. Subsequent authenticated requests may bypass the global Virtual IP (VIP) interface and load balancer 380 and be directed to a specific datacenter or may be directed to a datacenter specific load balancer which receives authenticated requests and then selects resources from the application server pools (e.g., 362 and 365) or available pods (e.g., 361, 364, 372, 373, 376, and 377) to conduct further processing.

In one embodiment, each of the respective datacenters 360, 370, and 375 constitute resources of a single host organization 310 which provides on-demand cloud based services. Datacenters (e.g., 360, 370, and 375) of the host organization 310 may be distributed globally. For instance, datacenter NA1 360 may be in California within North America, datacenter NA2 may be in the New York City area of North America, and datacenter EU1 375 may be in London servicing the European region. Additional datacenters and different localities may be utilized. Each of the respective datacenters (e.g., 360, 370, and 375) of the host organization 310 may include multiple computing pods (e.g., 361, 364, 372, 373, 376, and 377), in which each pod includes a database and a pool of application servers that may be utilized for authentication services as well as other computing tasks. For instance, datacenter NA1 360 is depicted with such detail in which pod 361 includes database 363 as well as a pool of application servers 362 and pod 364 includes database 366 as well as a pool of application servers 365. Datacenters 370 and 375 may implement a similar internal structure. The application servers may be allocated and de-allocated from computing tasks dynamically so as to meet the demand from users for computing resources of the host organization 310. For instance, additional application servers may be dynamically allocated to provide authentication services as demand for authentication increases, and then de-allocated when demand for authentication decreases.

In one embodiment, each datacenter may optionally include a local load balancer 371 which is capable to receive requests from the global Virtual IP (VIP) interface and load balancer 380 and distribute such workload requests amongst pods within the datacenter (e.g., pod 372 and 373 at datacenter NA2 370) and select instances from application server pools within the datacenter which are to receive such workload requests.

In one embodiment, a users table 378 is replicated amongst all pods within a single datacenter (e.g., 375) but is not replicated to other datacenters (e.g., 360 and 370), and thus, users tables at each of the datacenters is unique to each particular datacenter. For example, users table 378 is depicted as being replicated amongst pods 376 and 377 within the datacenter EU1 at element 375. In a different embodiment, a master users table is synchronized and replicated across all datacenters (e.g., 360, 370, and 375) of the host organization 310 and further specifies a home-geo datacenter for each respective user within the master users table. For instance, master users table 379 is shown being replicated from the datacenter EU1 at element 375 to each of datacenters 360 and 365. Such replication may be performed in each direction as required.

In one embodiment, new users are created within a single pod of a datacenter and are synchronized to the other pods and optionally to the remaining datacenters. In such an embodiment, an authentication request at a pod of a datacenter does not trigger a failure when the user is not found, but instead, causes a fan-out request to be triggered to first query other pods within the same datacenter for the user's instance and then subsequently triggers a cross-call fan-out request to one or more remote datacenters to query for the user's instance at the remote datacenters. If the user's instance cannot be identified at any datacenter, local or otherwise, then the request results in an error. If the user's instance is identified at a remote datacenter, then the authentication request is processed as described previously.

Thus, in accordance with one embodiment, there is a computing architecture within a host organization, the computing architecture including: one or more processors and memories to execute instructions; a plurality of datacenters geographically separated from one another, each of the plurality of datacenters having a plurality of computing pods therein including a database and a pool of application servers to perform workload processing on behalf of the host organization; a global virtual IP address interface and load balancer servicing a single URL endpoint for the host organization to receive login requests on behalf of the host organization; in which the global virtual IP address interface and load balancer is to receive a login request from a client device and forward the login request to one of the plurality of datacenters within the host organization; in which an application server at the selected datacenter determines the selected datacenter is a non-home-geo datacenter for a user associated with the login request received from the client device; in which the application server establishes a back-end link from the non-home-geo datacenter to another application server at a home-geo datacenter for the user and forwards the login request from the non-home-geo datacenter to the home-geo datacenter via the back-end link for authentication of the client device at the home-geo datacenter responsive to the login request received from the computing device; and in which the application server at the non-home-geo datacenter returns a response to the client device upon successful authentication of the login request by the other application server at the home-geo datacenter, in which the response specifies a re-direct to the home-geo datacenter for the user.

According to another embodiment of the computing architecture, each of the plurality of datacenters further includes a local load balancer to distribute workload amongst the plurality of computing pods application servers within each of the respective plurality of datacenters.

FIG. 4 is a flow diagram illustrating a method 400 in accordance with disclosed embodiments. Method 400 may be performed by processing logic that may include hardware (e.g., circuitry, dedicated logic, programmable logic, microcode, etc.), software (e.g., instructions run on a processing device to perform various operations such transmitting, sending, receiving, monitoring, recording, updating, calculating, etc., in pursuance of the systems, apparatuses, and methods for implementing a cross instance user authentication architecture, as described herein. For example, the web-browser, load balancer, and login server of FIG. 1A may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic receives a login request from a client device at a global Virtual Internet Protocol (VIP) address of a host organization.

At block 410, processing logic forwards the login request received at the global VIP address to one of a plurality of datacenters within the host organization.

At block 415, processing logic determines the selected datacenter is a non-home-geo datacenter for a user associated with the login request received from the client device.

At block 420, processing logic establishes a back-end link from the non-home-geo datacenter to a home-geo datacenter for the user.

At block 425, processing logic forwards the login request from the non-home-geo datacenter to the home-geo datacenter via the back-end link for authentication of the client device at the home-geo datacenter responsive to the login request received from the computing device.

At block 430, processing logic returns a response to the client device from the non-home-geo datacenter upon successful authentication of the login request at the home-geo datacenter, in which the response specifies a re-direct to the home-geo datacenter for the user.

According to another embodiment of the method 400, receiving a login request at a global Virtual Internet Protocol (VIP) address for the host organization from a client device includes: receiving the login request at a single URL endpoint servicing login requests for the host organization at the Virtual IP address specified regardless of the home-geo datacenter affiliated with incoming login requests.

According to another embodiment of the method 400, receiving a login request at a global Virtual Internet Protocol (VIP) address for the host organization from a client device includes receiving the login request at a global Virtual IP interface and load balancer for the host organization; and in which the global Virtual IP interface and load balancer selects the one of the plurality of datacenters within the host organization to process the login request received based on a geographic proximity of the client device making the login request and the selected one of the plurality of datacenters.

According to another embodiment of the method 400, the global Virtual IP interface and load balancer operates at computing hardware of the host organization which resides outside of the selected one of the plurality of datacenters and which resides outside of the home-geo datacenter for the user.

According to another embodiment of the method 400, the global Virtual IP interface and load balancer selects an instance from an application server pool at the selected datacenter to receive the login request for further processing.

According to another embodiment of the method 400, forwarding the login request received at the global VIP address to one of a plurality of datacenters within the host organization, includes: forwarding the login request to a local load balancer at the selected one of the plurality of datacenters, in which the local load balancer selects an instance from an application server pool within the selected datacenter to receive the login request for further processing.

According to another embodiment of the method 400, forwarding the login request from the non-home-geo datacenter to the home-geo datacenter via the back-end link, includes: determining a geographic region associated with the client device based on an Internet Protocol (IP) address for the client device; and performing geographic Internet Protocol (Geo-IP) routing for the client device based on the geographic region associated with the client device to select the one of a plurality of datacenters within the host organization.

According to another embodiment of the method 400, determining the selected datacenter is a non-home-geo datacenter for a user associated with the login request received from the client device, includes: receiving the login request at an application server within a first computing pod of the selected datacenter; checking a database within the first computing pod for a username passed with the login request; performing a fan-out operation to a second one or more computing pods within the selected datacenter requesting application servers in the respective second one or more computing pods check databases within the respective second one or more computing pods for the username passed with the login request when the username is not located in the database of the first computing pod; and performing a fan-out operation to a second one or more datacenters of the host organization distinct from the selected datacenter requesting application servers in the respective second one or more datacenters check databases within the respective second one or more datacenters for the username passed with the login request when the username is not located in any of the computing pods of the selected datacenter.

According to another embodiment the method 400 further includes: returning an error code to the computing device making the login request when the username is not identified within any datacenter of the host organization indicating the user is unknown or invalid; maintaining a count of invalid requests associated with computing device making the login request; and discarding further login requests from the computing device to protect against denial of service (DOS) attacks when the count of invalid requests from the computing device exceeds a threshold.

According to another embodiment the method 400 further includes one of: replicating a users table across all pods within individual datacenters of the host organization but not across multiple datacenters of the host organization, in which the users table specifies all users affiliated with the respective datacenter as their home-geo datacenter; or alternatively replicating a master users table across all datacenters of the host organization, in which the master users table specifies all users known to the host organization and the home-geo datacenter for each of the users known.

According to another embodiment the method 400 further includes: replicating a master users table across all datacenters of the host organization, in which the master users table specifies users associated with the host organization and the affiliated home-geo datacenter for each user; and in which the method further includes: determining a user associated with the login request received from the client device is unknown to the host organization after querying a single database at the selected datacenter when replication of the master users table is up-to-date, and determining the user associated with the login request received from the client device is unknown to the host organization after querying multiple databases within the selected datacenter and after querying all other datacenters of the host organization via fan-out operations when replication of the master users table is not up-to-date.

According to another embodiment the method 400 further includes: replicating a users table within the selected datacenter of the host organization, in which the users table specifies all users associated with the selected datacenter as their affiliated home-geo datacenter; and in which the method further includes: determining the selected datacenter is a non-home-geo datacenter for the user associated with the login request received from the client device after querying a single database at the selected datacenter when replication of the users table is up-to-date, and performing a fan-out operation to other datacenters of the host organization to determine which of the plurality of datacenters is the home-geo for the user associated with the login request received.

According to another embodiment of the method 400, receiving a login request at a global Virtual Internet Protocol (VIP) address for the host organization from a client device includes receiving the login request from a web-browser at the client device; in which establishing a back-end link from the non-home-geo datacenter to a home-geo datacenter for the user further includes communicating with the home-geo datacenter over the back-end link using a temporary session; and in which returning a response to the client device from the non-home-geo datacenter upon successful authentication of the login request at the home-geo datacenter further includes returning a valid session cookie for an authenticated session between the client device and the home-geo datacenter specified via the re-direct.

According to another embodiment of the method 400, receiving a login request at a global Virtual Internet Protocol (VIP) address for the host organization from a client device includes receiving an API based login request from the client device. Such a method further includes establishing a session for the API based login request; in which establishing a back-end link from the non-home-geo datacenter to a home-geo datacenter for the user further includes communicating with the home-geo datacenter over the back-end link using the session for the API based login request; and in which returning a response to the client device from the non-home-geo datacenter upon successful authentication of the login request at the home-geo datacenter further includes authenticating the session for the API based login request and returning a valid session cookie for the authenticated session for use between the client device and the home-geo datacenter specified via the re-direct.

According to another embodiment of the method 400, authentication of the client device at the home-geo datacenter responsive to the login request received from the computing device includes: validating a username and password passed with the login request.

According to another embodiment of the method 400, authentication of the client device further includes: validating an Internet Protocol (IP) address associated with the user's login request; validating the user against permissible login hours for the username specified; and validating a challenge response to a further authentication challenge issued by the host organization responsive to the login request.

According to another embodiment of the method 400, establishing a back-end link from the non-home-geo datacenter to a home-geo datacenter for the user includes opening a secure HTTP compatible tunnel between an application server instance of the non-home-geo datacenter and an application server instance at the home-geo datacenter.

According to another embodiment of the method 400, forwarding the login request from the non-home-geo datacenter to the home-geo datacenter via the back-end link comprises communicating cross-instance calls between the non-home-geo datacenter and the home-geo datacenter, wherein each of the cross-instance calls are secured by one or more of the following: a temporary session ID created uniquely for the communications between the non-home-geo datacenter and the home-geo datacenter in fulfillment of the login request; a header specifying a hash of the MAC address of the instance at the non-home-geo datacenter to protect against modification to the cross-instance calls en-route; and IP restriction applied to the cross-instance calls on the back-end link to prevent external parties from accessing or modifying the cross-instance calls being communicated.

According to another embodiment the method 400 further includes: receiving the login request at the host organization as one of a plurality of requests received from a plurality of customer organizations, in which each customer organization is an entity selected from the group consisting of: a separate and distinct remote organization, an organizational group within the host organization, a business partner of the host organization, or a customer organization that subscribes to cloud computing services provided by the host organization.

According to another embodiment of the method 400, the host organization implements a multi-tenant database system having therein elements of hardware and software that are shared by a plurality of separate and distinct customer organizations, each of the separate and distinct customer organizations being remotely located from the datacenters of the host organization and in which the customer organizations communicate with the host organization over a public Internet.

According to one embodiment, there is a non-transitory computer readable storage medium storage medium having instructions stored thereon that, when executed by a computing hardware of a host organization including one or more processors and memories, the instructions cause the host organization to perform operations comprising: receiving a login request at a global Virtual Internet Protocol (VIP) address for the host organization from a client device; forwarding the login request received at the global VIP address to one of a plurality of datacenters within the host organization; determining the selected datacenter is a non-home-geo datacenter for a user associated with the login request received from the client device; establishing a back-end link from the non-home-geo datacenter to a home-geo datacenter for the user; forwarding the login request from the non-home-geo datacenter to the home-geo datacenter via the back-end link for authentication of the client device at the home-geo datacenter responsive to the login request received from the computing device; and returning a response to the client device from the non-home-geo datacenter upon successful authentication of the login request at the home-geo datacenter, in which the response specifies a re-direct to the home-geo datacenter for the user.

In another embodiment of the non-transitory computer readable storage medium, receiving a login request at a global Virtual Internet Protocol (VIP) address for the host organization from a client device includes: receiving the login request at a single URL endpoint servicing login requests for the host organization at the Virtual IP address specified regardless of the home-geo datacenter affiliated with incoming login requests.

In another embodiment of the non-transitory computer readable storage medium, forwarding the login request from the non-home-geo datacenter to the home-geo datacenter via the back-end link, includes: determining a geographic region associated with the client device based on an Internet Protocol (IP) address for the client device; performing geographic Internet Protocol (Geo-IP) routing for the client device based on the geographic region associated with the client device to select the one of a plurality of datacenters within the host organization.

Figure 5:
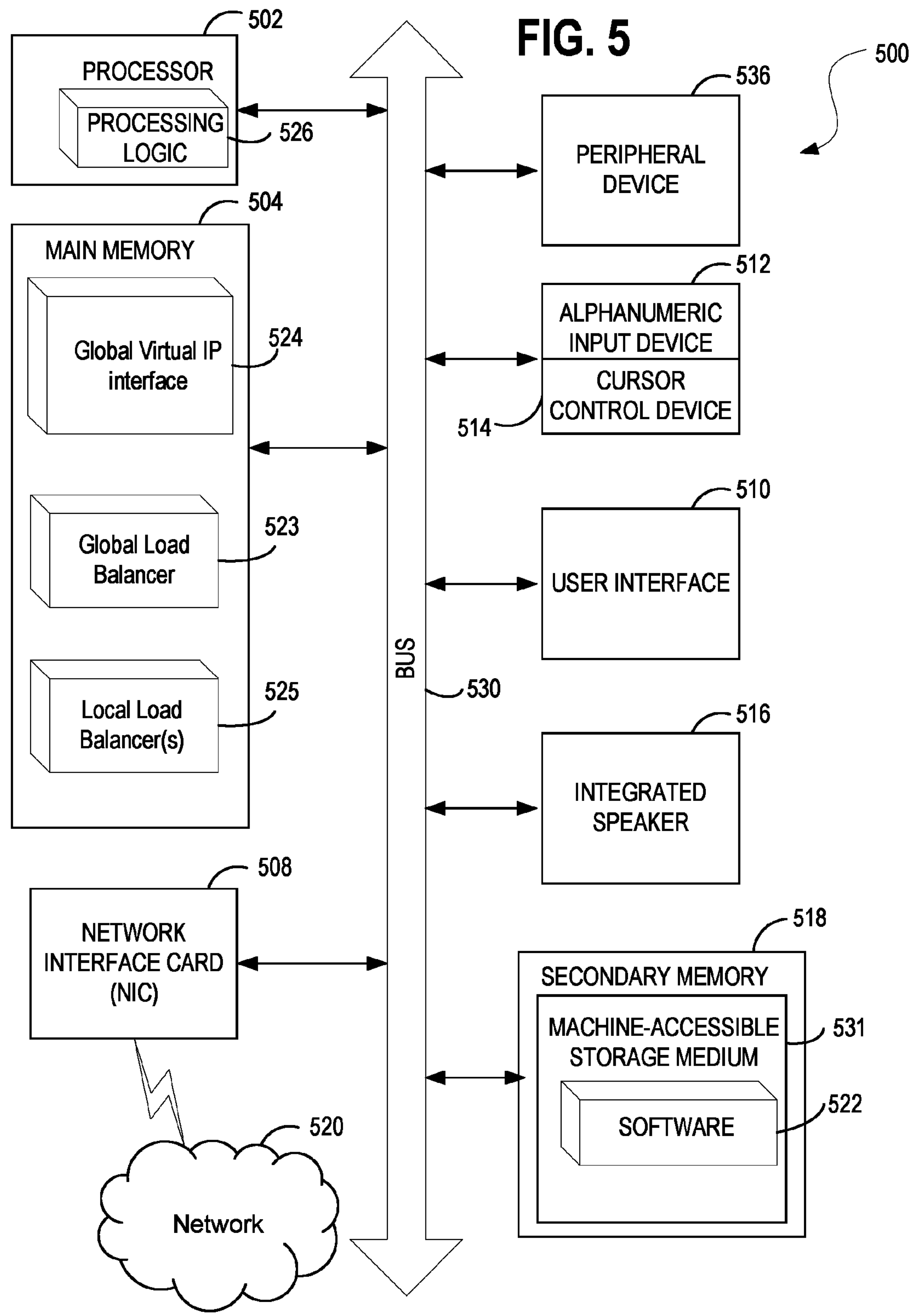
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a global virtual IP interface at element 524, a global load balancer at element 525, and local load balancer(s) at element 523, for instance, one being local to each of a plurality of datacenters as described previously. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
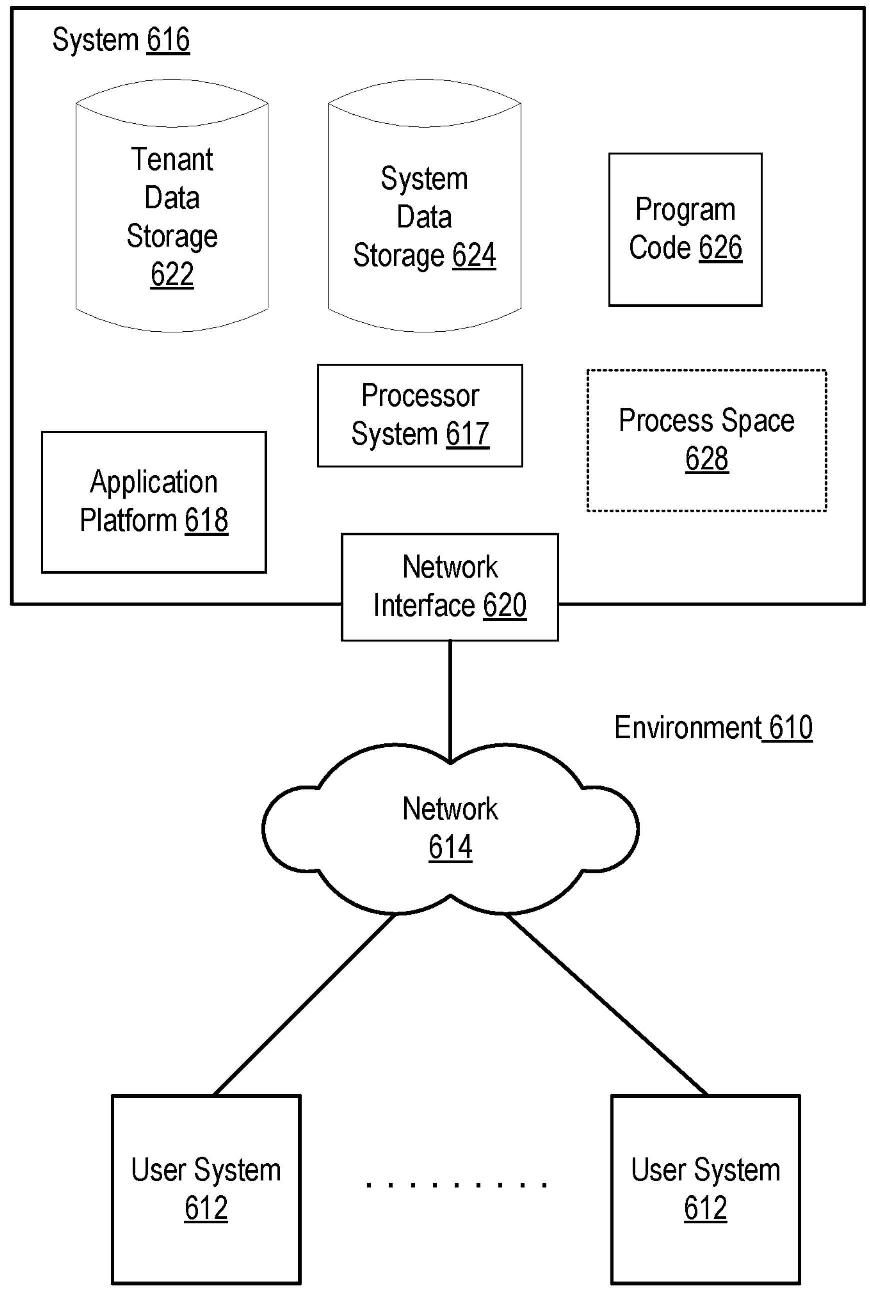
FIG. 6 illustrates a block diagram of an example of an environment in which an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 may be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device may be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 7:
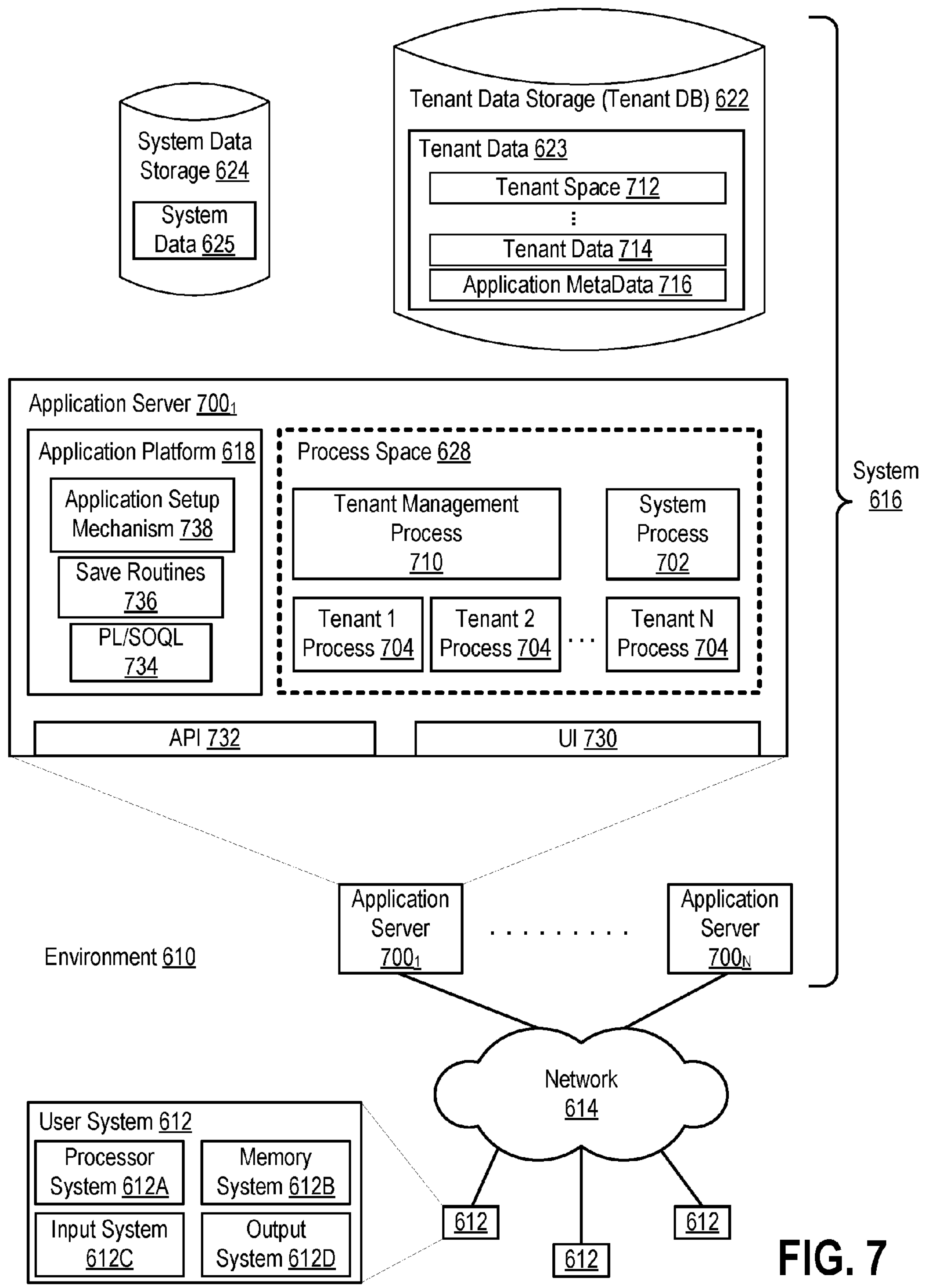
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $\mathbf{700}_1$-$\mathbf{700}_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which may be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $\mathbf{700}_1$ might be coupled via the network 614 (e.g., the Internet), another application server $\mathbf{700}_{N-1}$ might be coupled via a direct network link, and another application server $\mathbf{700}_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also may be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system at a host organization, the system having at least a processor and a memory therein, wherein the method comprises:

receiving a login request at a global Virtual Internet Protocol (VIP) address for the host organization from a client device by receiving the login request at a single URL endpoint servicing login requests for the host organization at the global Virtual IP address regardless of the home-geo datacenter affiliated with incoming login requests and wherein a login authentication service for the host organization is provided via the single URL endpoint without being restricted to any individual user's home-geo datacenter;

forwarding the login request received at the global VIP address to a selected one of a plurality of datacenters within the host organization;

determining the selected one of the plurality of datacenters is a non-home-geo datacenter for a user associated with the login request received from the client device;

in response to the determining, opening a secure HTTP tunnel from the non-home-geo datacenter to a home-geo datacenter for the user via a secure HTTP tunneling protocol;

forwarding the login request from the non-home-geo datacenter to the home-geo datacenter via the secure HTTP tunnel for authentication of the client device at the home-geo datacenter responsive to the login request received from the client device; and upon successful authentication of the login request at the home-geo datacenter, redirecting the client device from the non-home-geo datacenter by sending a response to the client device wherein the response specifies a re-direct causing the client device to re-direct to the home-geo datacenter for the user.

2. The method of claim 1, wherein users utilize the single URL endpoint to access the login authentication service regardless of whether the user is accessing the single URL endpoint from inside or outside of a home-geo for each respective user; and wherein the host organization implements a Geo-IP routing procedure running at a global load balancer of the system to analyze the received request and to selectively route the received request to a datacenter geographically nearest the user to improve access speed regardless of how distant the user is from a home geography associated with the user.

3. The method of claim 1:

wherein receiving a login request at the global Virtual Internet Protocol (VIP) address for the host organization from the client device comprises receiving the login request at a global Virtual IP interface and load balancer for the host organization; and wherein the global Virtual IP interface and load balancer selects the one of the plurality of datacenters within the host organization to process the login request received based on a geographic proximity of the client device making the login request and the selected one of the plurality of datacenters.

4. The method of claim 3, wherein the global Virtual IP interface and load balancer operates at computing hardware of the host organization which resides outside of the selected one of the plurality of datacenters and which resides outside of the home-geo datacenter for the user.

5. The method of claim 3, wherein the global Virtual IP interface and load balancer selects an instance from an application server pool at the selected datacenter to receive the login request for further processing.

6. The method of claim 3, wherein forwarding the login request received at the global VIP address to the selected one of the plurality of datacenters within the host organization, comprises:

forwarding the login request to a local load balancer at the selected one of the plurality of datacenters, wherein the local load balancer selects an instance from an application server pool within the selected datacenter to receive the login request for further processing.

7. The method of claim 1, wherein forwarding the login request from the non-home-geo datacenter to the home-geo datacenter via the secure HTTP tunnel, comprises:

determining a geographic region associated with the client device based on an Internet Protocol (IP) address for the client device; and performing geographic Internet Protocol (Geo-IP) routing for the client device based on the geographic region associated with the client device to select the one of a plurality of datacenters within the host organization.

8. The method of claim 1, wherein determining the selected one of the plurality of datacenters is a non-home-geo datacenter for a user associated with the login request received from the client device, comprises:

receiving the login request at an application server within a first computing pod of the selected datacenter;

checking a database within the first computing pod for a username passed with the login request;

performing a fan-out operation to a second one or more computing pods within the selected datacenter requesting application servers in the respective second one or more computing pods check databases within the respective second one or more computing pods for the username passed with the login request when the username is not located in the database of the first computing pod; and performing a fan-out operation to a second one or more datacenters of the host organization distinct from the selected datacenter requesting application servers in the respective second one or more datacenters check databases within the respective second one or more datacenters for the username passed with the login request when the username is not located in any of the computing pods of the selected datacenter.

9. The method of claim 8, further comprising:

returning an error code to the client device making the login request when the username is not identified within any datacenter of the host organization indicating the user is unknown or invalid;

maintaining a count of invalid requests associated with the client device making the login request; and discarding further login requests from the client device to protect against denial of service (DOS) attacks when the count of invalid requests from the client device exceeds a threshold.

10. The method of claim 1, further comprising one of:

replicating a users table across all pods within individual datacenters of the host organization but not across multiple datacenters of the host organization, wherein the users table specifies all users affiliated with the respective datacenter as their home-geo datacenter;

or alternatively replicating a master users table across all datacenters of the host organization, wherein the master users table specifies all users known to the host organization and the home-geo datacenter for each of the users known.

11. A system to execute within a host organization, the system having one or more processors and memories to execute instructions, wherein the system comprises:

a plurality of datacenters geographically separated from one another;

a global Virtual Internet Protocol (VIP) address interface that receives a login request at a global VIP address for the host organization from a client device by receiving the login request at a single URL endpoint servicing login requests for the host organization at the global Virtual IP address regardless of the home-geo datacenter affiliated with incoming login requests and wherein a login authentication service for the host organization is provided via the single URL endpoint without being restricted to any individual user's home-geo datacenter;

a load balancer that forwards the login request received at the global VIP address to a selected one of a plurality of datacenters within the host organization;

an application server at the selected one of the plurality of datacenters that determines the selected datacenter is a non-home-geo datacenter for a user associated with the login request received from the client device;

in response to the determining, the application server opens a secure HTTP tunnel from the non-home-geo datacenter to a home-geo datacenter for the user via a secure HTTP tunneling protocol;

the application server forwards the login request from the non-home-geo datacenter to the home-geo datacenter via the secure HTTP tunnel for authentication of the client device at the home-geo datacenter responsive to the login request received from the client device; and upon successful authentication of the login request at the home-geo datacenter, the application server redirects the client device from the non-home-geo datacenter by sending a response to the client device wherein the response specifies a re-direct causing the client device to re-direct to the home-geo datacenter for the user.

12. The system of claim 11:

wherein the load balancer is to select the one of the plurality of datacenters within the host organization to process the login request received based on a geographic proximity of the client device making the login request and the selected one of the plurality of datacenters.

13. The system of claim 12, wherein the load balancer is to select an instance from an application server pool at the selected datacenter to receive the login request for further processing.

14. The system of claim 12, wherein the global VIP address interface is to forward the login request received to a local load balancer at the selected one of the plurality of datacenters, wherein the local load balancer selects an instance from an application server pool within the selected datacenter to receive the login request for further processing.

15. The system of claim 11, wherein the global VIP address interface is to further determine a geographic region associated with the client device based on an Internet Protocol (IP) address for the client device and perform geographic Internet Protocol (Geo-IP) routing for the client device based on the geographic region associated with the client device to select the one of a plurality of datacenters within the host organization.

16. A non-transitory computer readable storage medium having instructions stored thereon that, when executed by a computing hardware of a host organization including one or more processors and memories, the instructions cause the host organization to perform operations comprising:

receiving a login request at a global Virtual Internet Protocol (VIP) address for the host organization from a client device by receiving the login request at a single URL endpoint servicing login requests for the host organization at the global Virtual IP address regardless of the home-geo datacenter affiliated with incoming login requests and wherein a login authentication service for the host organization is provided via the single URL endpoint without being restricted to any individual user's home-geo datacenter;

forwarding the login request received at the global VIP address to a selected one of a plurality of datacenters within the host organization;

determining the selected one of the plurality of datacenters is a non-home-geo datacenter for a user associated with the login request received from the client device;

in response to the determining, opening a secure HTTP tunnel from the non-home-geo datacenter to a home-geo datacenter for the user via a secure HTTP tunneling protocol;

forwarding the login request from the non-home-geo datacenter to the home-geo datacenter via the secure HTTP tunnel for authentication of the client device at the home-geo datacenter responsive to the login request received from the client device; and upon successful authentication of the login request at the home-geo datacenter, redirecting the client device from the non-home-geo datacenter by sending a response to the client device wherein the response specifies a re-direct causing the client device to re-direct to the home-geo datacenter for the user.

17. The non-transitory computer readable storage medium of claim 16:

wherein receiving a login request at the global Virtual Internet Protocol (VIP) address for the host organization from a client device comprises receiving the login request at a global Virtual IP interface and load balancer for the host organization; and wherein the global Virtual IP interface and load balancer selects the one of the plurality of datacenters within the host organization to process the login request received based on a geographic proximity of the client device making the login request and the selected one of the plurality of datacenters.

18. The non-transitory computer readable storage medium of claim 17, wherein the global Virtual IP interface and load balancer selects an instance from an application server pool at the selected datacenter to receive the login request for further processing.

19. The non-transitory computer readable storage medium of claim 17, wherein forwarding the login request received at the global VIP address to one of a plurality of datacenters within the host organization, comprises:

forwarding the login request to a local load balancer at the selected one of the plurality of datacenters, wherein the local load balancer selects an instance from an application server pool within the selected datacenter to receive the login request for further processing.

20. The non-transitory computer readable storage medium of claim 16, wherein forwarding the login request from the non-home-geo datacenter to the home-geo datacenter via the secure HTTP tunnel, comprises:

determining a geographic region associated with the client device based on an Internet Protocol (IP) address for the client device; and performing geographic Internet Protocol (Geo-IP) routing for the client device based on the geographic region associated with the client device to select the one of a plurality of datacenters within the host organization.

* * * * *